United States Patent
Qi et al.

(10) Patent No.: US 9,441,131 B2
(45) Date of Patent: *Sep. 13, 2016

(54) CNT/FLUOROPOLYMER COATING COMPOSITION

(75) Inventors: Yu Qi, Oakville (CA); Nan-Xing Hu, Oakville (CA); Sandra Gardner, Oakville (CA); Vlad Skorokhod, Mississauga (CA); Qi Zhang, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 838 days.

This patent is subject to a terminal disclaimer.

(21) Appl. No.: 12/198,460

(22) Filed: Aug. 26, 2008

(65) Prior Publication Data

US 2010/0055450 A1   Mar. 4, 2010

(51) Int. Cl.
| | |
|---|---|
| *C08K 5/45* | (2006.01) |
| *C08K 3/04* | (2006.01) |
| *C08K 5/17* | (2006.01) |
| *C08K 3/22* | (2006.01) |
| *B32B 7/00* | (2006.01) |
| *C08K 3/34* | (2006.01) |
| *C08K 3/14* | (2006.01) |
| *C08K 5/092* | (2006.01) |
| *C09D 127/18* | (2006.01) |

(Continued)

(52) U.S. Cl.
CPC ............ *C09D 127/18* (2013.01); *C08K 5/005* (2013.01); *C08K 7/24* (2013.01); *Y10T 428/265* (2015.01)

(58) Field of Classification Search
None
See application file for complete search history.

(56) References Cited

U.S. PATENT DOCUMENTS

| | | |
|---|---|---|
| 4,113,597 A | 9/1978 | Rabi et al. |
| 5,204,156 A | 4/1993 | Lumb et al. |
| 6,295,434 B1 | 9/2001 | Chang et al. |

(Continued)

FOREIGN PATENT DOCUMENTS

| | | |
|---|---|---|
| EP | 1580514 | 9/2008 |
| WO | 02016257 A3 | 2/2002 |

(Continued)

OTHER PUBLICATIONS

Kim et al., A Facile Approach to Single-Wall Carbon Nanotube/Poly(allylamine) Nanocomposites, 2007, Macromolecular Rapid Communications, vol. 28, pp. 276-280.*

(Continued)

*Primary Examiner* — Callie Shosho
*Assistant Examiner* — Patrick English
(74) *Attorney, Agent, or Firm* — MH2 Technology Law Group LLP

(57) ABSTRACT

Exemplary embodiments provide nanotube-containing coating compositions and methods for making and using the coating compositions. In an exemplary embodiment, the coating composition can include a plurality of nanotubes (e.g., carbon nanotubes (CNTs)) dispersed stably and uniformly in a polymer matrix containing fluoropolymers. The coating composition can further include stabilizers to allow a stable and/or uniform dispersion of the plurality of nanotubes in the fluoropolymers. The nanotube coating composition can be coated on an article surface to improve mechanical robustness, and electrical and thermal conductivity of the coated article. The coated article can be used as, for example, a fuser member, a fixing member, a pressure roller, or a release agent donor member in an electrostatographic printing machine or process.

23 Claims, 7 Drawing Sheets

(51) Int. Cl.
*C08K 5/00* (2006.01)
*C08K 7/24* (2006.01)

(56) References Cited

U.S. PATENT DOCUMENTS

| | | | |
|---|---|---|---|
| 6,514,650 | B1 | 2/2003 | Schlueter et al. |
| 6,566,452 | B1* | 5/2003 | Bladel et al. ............ 525/199 |
| 6,927,006 | B2* | 8/2005 | Finn et al. ............ 430/124.35 |
| 7,033,672 | B2* | 4/2006 | Martin et al. ............ 428/422 |
| 7,205,513 | B2 | 4/2007 | Pan et al. |
| 8,557,345 | B2* | 10/2013 | Qi ....................... C09D 7/1291 |
| | | | 427/385.5 |
| 9,062,219 | B2 | 6/2015 | Qi et al. |
| 2002/0028288 | A1* | 3/2002 | Rohrbaugh et al. ......... 427/180 |
| 2003/0018130 | A1 | 1/2003 | Dvornic et al. |
| 2003/0054155 | A1 | 3/2003 | Nomi et al. |
| 2004/0206942 | A1 | 10/2004 | Hsu |
| 2005/0038225 | A1* | 2/2005 | Charati et al. ............ 528/272 |
| 2005/0186378 | A1* | 8/2005 | Bhatt ............ 428/36.9 |
| 2005/0244650 | A1 | 11/2005 | Ren et al. |
| 2005/0261760 | A1 | 11/2005 | Weber |
| 2006/0052509 | A1 | 3/2006 | Saitoh |
| 2006/0054866 | A1* | 3/2006 | Ait-Haddou et al. .... 252/378 R |
| 2006/0057339 | A1* | 3/2006 | Adachi et al. ............ 428/195.1 |
| 2006/0156475 | A1 | 7/2006 | Oles et al. |
| 2006/0292360 | A1* | 12/2006 | Hays et al. ............ 428/323 |
| 2007/0044906 | A1* | 3/2007 | Park ............ 156/272.2 |
| 2007/0082965 | A1 | 4/2007 | Yasuda et al. |
| 2010/0183864 | A1 | 7/2010 | Qi et al. |
| 2010/0184346 | A1 | 7/2010 | Qi et al. |

FOREIGN PATENT DOCUMENTS

| | | |
|---|---|---|
| WO | 2004097853 A1 | 11/2004 |
| WO | WO 2004097853 A1 * | 11/2004 |
| WO | 2007001405 | 1/2007 |
| WO | 2007024206 | 3/2007 |
| WO | 2008046166 | 4/2008 |
| WO | 2008085550 | 7/2008 |

OTHER PUBLICATIONS

NanoIntegris, HIPCO® Product Sheet, Retrieved Jan. 3, 2012, http://www.nanointegris.com/en/hipco.*

Syed, Conducting Polymers and the Evolving Electronics Technology, NASA/JSC, Retrieved Mar. 27, 2012, https://nepp.nasa.gov/docuploads/4D1C9F67-F567-4E16-8BC92D3B88761016/SyedRevision2.pdf, pp. 1-2.*

Liu et al., Weak polyelectrolyte control of carbon nanotube dispersion in water, Journal of Colloid and Interface Science, vol. 317, Aug. 31, 2007, pp. 346-349.*

XP002575929, Database WPI Week 200541, Thomson Scientific, London, GB: AN 2005-398495 & JP 2005 132919, May 26, 2005, 3 pages.

European Search Report, European Application No. 10150822, dated Apr. 9, 2010, 9 pages, published by the European Patent Office.

Pavoor, "Tribiological and Mechanical Characterization of Polyelectrolyte Multilayer Nanoassemblies", MIT Libraries, 2005, pp. 21, 22, 31, 103 and 104.

Pavoor, "Tribiological and Mechanical Characterization of Polyelectrolyte Multilayer Nanoassemblies", ProQuest Abstract, 2005, 1 page.

Non-Final Office Action dated Feb. 16, 2012, for U.S. Appl. No. 12/198,551, filed Aug. 26, 2008, pp. 1-14.

Non-Final Office Action dated Nov. 29, 2010, for U.S. Appl. No. 12/198,551, filed Aug. 26, 2008, pp. 1-14.

Final Office Action dated Jun. 10, 2010, for U.S. Appl. No. 12/198,551, filed Aug. 26, 2008, pp. 1-13.

Lagarkov et al., "Electromagnetic Properties of Composites Containing Elongated Conducting Inclusions", Physical Review B, vol. 53, No. 10, 1996, pp. 6318-6336.

Non-Final Office Action dated Dec. 7, 2009, for U.S. Appl. No. 12/198,551, filed Aug. 26, 2008, pp. 1-12.

Jason H. Rouse et al., "Polymer/Single-Walled Carbon Nanotube Films Assembled via Donor-Acceptor Interactions and Their Use as Scaffolds for Silica Deposition", Chem. Mater. 2004, 16, pp. 3904-3910.

Qi et al., "CNT Reinforced PTFE/Elastomer Composites to Enable Long Life, Oil-Less Fusers", U.S. Appl. No. 12/245,850, filed Oct. 6, 2008.

Gervasi et al., "Functional Surfaces Comrpised of Hyper Nanocomposites (HNC) for Marking Subsystem Applications", U.S. Appl. No. 12/603,750, filed Oct. 22, 2009.

Final Office Action dated Sep. 17, 2014, U.S. Appl. No. 12/603,750, filed Oct. 22, 2009, pp. 1-12.

Non-Final Office Action dated Sep. 11, 2013, U.S. Appl. No. 12/245,850, filed Oct. 6, 2008, pp. 1-14.

* cited by examiner

CNT/FLUOROPOLYMER COATING COMPOSITION

FIELD OF THE INVENTION

This invention relates generally to coating compositions and methods for making and using the coating compositions and, more particularly, to nanotube-containing coating compositions and methods for making and coating the nanotube-containing coating compositions used for electrostatographic devices and processes.

BACKGROUND OF THE INVENTION

In electrophotography (also known as xerography, electrophotographic imaging or electrostatographic imaging), the surface of an imaging member (e.g., photoreceptor) is first uniformly electrostatically charged. The imaging member contains a photoconductive insulating layer on a conductive layer and is then exposed to a pattern of activating electromagnetic radiation, such as a light. Charge generated by the photoactive pigment moves under the force of the applied field. The movement of the charge through the photoreceptor selectively dissipates the charge on the illuminated areas of the photoconductive insulating layer while leaving behind an electrostatic latent image. This electrostatic latent image is then developed to form a visible image by depositing oppositely charged particles on the surface of the photoconductive insulating layer.

The resulting visible image is then transferred from the imaging member directly or indirectly (such as by a transfer or other member) to a print substrate, such as a transparency or paper sheet. The imaging process may be repeated many times with reusable imaging members. The visible toner image is therefore transferred on the print substrate and is usually fixed or fused to form permanent images since the visible toner image is in a loose powdered form and can be easily disturbed or destroyed. The use of thermal energy for fixing toner images onto a support member is well known. In order to fuse electroscopic toner material onto a support surface permanently by heat, it is necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Several approaches to thermal fusing of electroscopic toner images have been described in the prior art. These methods include providing the application of heat and pressure substantially concurrently by various means: a roll pair maintained in pressure contact; a belt member in pressure contact with a roll; and the like. Heat may be applied by heating one or both of the rolls, plate members or belt members. The fusing of the toner particles takes place when the proper combination of heat, pressure and contact time is provided. The balancing of these parameters to bring about the fusing of the toner particles is well known in the art, and they can be adjusted to suit particular machines or process conditions.

Fuser and fixing rolls or belts may be prepared by applying one or more layers to a suitable substrate. Typically, fuser and fixing rolls or belts include a surface layer for good toner releasing. Cylindrical fuser and fixer rolls may be prepared by applying a silicone elastomer or fluoroelastomer to serve as a releasing layer. Known fuser surface coatings also include crosslinked fluoropolymers such as VITON-GF® (DuPont) used in conjunction with a release fluid.

Another type of surface layer materials includes fluororesin such as polytetrafluoroethylene (PTFE), perfluoroalkylvinylether copolymer (PFA) and the like. This type of materials are desired for oil-less fusing, namely, no release fluid being required. Specifically, the Teflon surface enables oil-less fusing and the silicone layer provides conformability which enables rough paper fix, low mottle and good uniformity. Problems arise, however, due to insufficient mechanical robustness of the Teflon surface coatings, e.g., cracking and abrasion, which results in short operating life of the fuser. In addition, there is a need for electrical conductivity to dissipate the electrostatic built up during fusing process.

Carbon nanotubes (CNTs) possess exceptional mechanical properties and superior electric and thermal properties and can be used as reinforcement for structural composites. It is therefore desired to employ carbon nanotubes for the fuser. However, due to the unique structural features of CNTs, e.g., the nanometer size and the high aspect ratio, CNTs tend to stay aggregated in the resulting composite.

Thus, there is a need to overcome these and other problems of the prior art and to provide coating compositions and methods for making and using the coating compositions where CNTs can be stably and uniformly dispersed in the composition.

SUMMARY OF THE INVENTION

According to various embodiments, the present teachings include a coating composition. The coating composition can include a fluoropolymer, a plurality of nanotubes dispersed in a media; and a stabilizer mixed with the plurality of nanotubes. The stabilizer can be used to allow a stable dispersion of the plurality of nanotubes in the media and in the fluoropolymer.

According to various embodiments, the present teachings also include a coated article. The coated article can include a substrate, and a coated layer. The coated layer can be disposed over the substrate and formed from applying a coating composition to the substrate. The coating composition can include a fluoropolymer, a plurality of nanotubes dispersed in a media; and a stabilizer mixed with the plurality of nanotubes. The stabilizer can be used to allow a stable dispersion of the plurality of nanotubes in the media and in the fluoropolymer.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Figure 1:
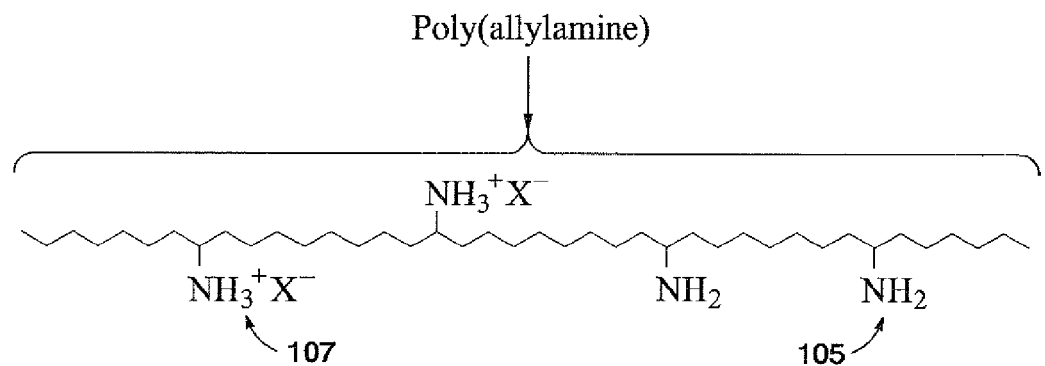
FIG. 1 depicts a schematic showing an exemplary stabilizer polymer in accordance with the present teachings.

Reference will now be made in detail to the present embodiments (exemplary embodiments) of the invention, an example of which is illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising As used herein, the term "one or more of" with respect to a listing of items such as, for example, A and B, means A alone, B alone, or A and B. The term "at least one of" is used to mean one or more of the listed items can be selected.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-range between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

Exemplary embodiments provide nanotube-containing coating compositions and methods for making and using the coating compositions. In an exemplary embodiment, the coating composition can include a plurality of nanotubes (e.g., carbon nanotubes (CNTs)) dispersed stably and uniformly in a polymer matrix containing fluoropolymers. The coating composition can further include stabilizers to allow a stable and/or uniform dispersion of the plurality of nanotubes in the fluoropolymers The nanotube coating composition can be coated on an article surface to improve mechanical robustness, and electrical and thermal conductivity of the coated article. The coated article can be used in an electrostatographic printing device or process, e.g., to enable electrostatic dissipation and surface heat uniformity The coated article can be used as, such as, for example, a fuser member, a fixing member, a pressure roller, or a release agent donor member.

As used herein and unless otherwise specified, the term "nanotubes" refers to elongated materials (including organic and inorganic materials) having at least one minor dimension, for example, width or diameter, about 100 nanometers or less. Although the term "nanotubes" is referred to throughout the description herein for illustrative purposes, it is intended that the term also encompass other elongated structures of like dimensions including, but not limited to, nanoshafts, nanopillars, nanowires, nanorods, and nanoneedles and their various functionalized and derivatized fibril forms, which include nanofibers with exemplary forms of thread, yarn, fabrics, etc.

In various embodiments, the nanotubes can have an inside diameter and an outside diameter. For example, the inside diameter can range from about 0.5 to about 20 nanometers, while the outside diameter can range from about 1 to about 80 nanometers. The nanotubes can have an aspect ratio, e.g., ranging from about 1 to about 10000.

The term "nanotubes" can also include single wall nanotubes such as single wall carbon nanotubes (SWCNTs), multi-wall nanotubes such as multi-wall carbon nanotubes (MWCNTs), and their various functionalized and derivatized fibril forms such as nanofibers. The term "nanotubes" can further include carbon nanotubes including SWCNTs and/or MWCNTs. Furthermore, the term "nanotubes" can include modified nanotubes from all possible nanotubes described thereabove and their combinations. The modification of the nanotubes can include a physical and/or a chemical modification.

The nanotubes can have various cross sectional shapes, such as, for example, rectangular, polygonal, oval, or circular shape. Accordingly, the nanotubes can have, for example, cylindrical 3-dimensional shapes.

The nanotubes can be formed of conductive or semi-conductive materials. In some embodiments, the nanotubes can be obtained in low and/or high purity dried paper forms or can be purchased in various solutions. In other embodiments, the nanotubes can be available in the as-processed unpurified condition, where a purification process can be subsequently carried out.

The nanotubes can provide exceptional and desired functions, such as, mechanical, electrical (e.g., conductivity), and thermal (e.g., conductivity) functions to the coating composition and the coated article. In addition, the nanotubes can be modified/functionalized nanotubes with controlled and/or increased mechanical, electrical or thermal properties through various physical and/or chemical modifications.

The nanotubes, such as carbon nanotubes (CNTs), can be dispersed in a media first in order to form the coating composition The media used for the plurality of nanotubes can be a liquid including, but not limited to, water, alcohols, aliphatic hydrocarbons of, e.g., from C5 to about C18, aromatic hydrocarbons of, e.g., from C6 to C18, dioxanes, ethers, ketones, amides and mixtures thereof. The nanotubes can further be dispersed in the polymer matrix, e.g., fluoropolymers, having a weight loading of, for example, about 0.01% to about 20% of the fluoropolymer.

As used herein, the term "fluoropolymer" refers to a polymer that has a monomeric repeat unit selected from the group consisting of tetrafluoroethylene, perfluoro(methyl vinyl ether), perfluoro(propyl vinyl ether), perfluoro(ethyl vinyl ether), vinylidene fluoride, hexafluoropropylene, and mixtures thereof. The fluoropolymers can include linear or branched polymers, and/or cross-linked fluoroelastomers. Examples of fluoropolymer can include a poly(vinylidene fluoride), or a copolymer of vinylidene fluoride with another monomer selected from the group consisting of hexafluoropropylene, tetrafluoroethyelene, and a mixture thereof.

Other suitable fluoropolymers can include fluororesins and fluoroelastomers. Examples of suitable fluororesin can include polytetrafluoroethylene, copolymer of tetrfluoroethylene and hexafluoropropylene, copolymer of tetrafluoroethylene and perfluoro(propyl vinyl ether), copolymer of tetrafluoroethylene and perfluoro(ethyl vinyl ether), copolymer of tetrafluoroethylene and perfluoro(methyl vinyl ether).

Examples of suitable fluoroelastomers can include, but are not limited to, i) copolymers of vinylidenefluoride and hexafluoropropylene; ii) terpolymers of vinylidenefluoride, hexafluoropropylene and tetrafluoroethylene; and iii) tetrapolymers of vinylidenefluoride, hexafluoropropylene, tetrafluoroethylene and a cure site monomer. For example, specifically, suitable fluoropolymers can be those described in detail in U.S. Pat. Nos. 5,166,031, 5,281,506, 5,366,772, 5,370,931, 4,257,699, 5,017,432 and 5,061,965, the entire disclosures each of which are incorporated by reference herein in their entirety. As described therein these fluoropolymers, particularly from the class of copolymers of vinylidenefluoride and hexafluoropropylene; terpolymers of vinylidenefluoride, hexafluoropropylene and tetrafluoroethylene; and tetrapolymers of vinyl idenefluorid e, hexafluoro propylene, tetrafluoroethylene and cure site monomer, can be known commercially under various designations as Teflon® PFA (polyfluoroalkoxypolytetrafluoroethylene), Teflon® PTFE (polytetrafluoroethylene), Teflon® FEP (fluorinated ethylenepropylene copolymer), Viton A® (copolymers of hexafluoropropylene (HFP) and vinylidene fluoride (VDF or VF2)), Viton ®-B, (terpolymers of tetrafluoroethylene (TFE), vinylidene fluoride (VDF) and hexafluoropropylene (HFP)); and Viton ®-GF, (tetrapolymers including TFE, VF2, HFP), as well as Viton E®, Viton E 60C®, Viton E430®, Viton 910®, Viton GH® and Viton GF®. The Teflon® and Viton® designations are Trademarks of E.I. DuPont de Nemours, Inc.

The cure site monomer can be, for example, 4-bromoperfluorobutene-1,1,1-dihydro-4-bromoperfluorobutene-1,3-bromoperfluoropropene-1,1,1-dihydro-3-bromoperfluoropropene-1, or any other suitable, known cure site monomer commercially available from DuPont. Other commercially available fluoropolymers can include, for example, Fluorel 2170®, Fluorel 2174®, Fluorel 2176®, Fluorel 2177® and Fluorel LVS 76®, Fluorel® being a Trademark of 3M Company. Additional commercially available materials can include Aflas® a poly(propylene-tetrafluoroethylene) and Fluorel II® (LII900) a poly(propylene-tetrafluoroethylenevinylidenefluoride) both also available from 3M Company, as well as the Tecnoflons identified as For-60KIR®, For-LHF®, NM®, For-THF®, For-TFS®, TH®, and TN505®, available from Montedison Specialty Chemical Company. In certain embodiments, the fluoropolymer can be PFA Teflon®, Viton GF® or Viton GH®.

Because of a large surface area to volume ratio, nanotubes can have a tendency to clump together or agglomerate, and as such may not be amenable to processing into nanotube/polymer composites. One or more stabilizers can be used to facilitate the stable and uniform dispersion of nanotubes in the polymer to form the disclosed nanotube composite.

As used herein the term "stabiizer" refers to any functional material admixed with the plurality of nanotubes and/or the nanotube coating composition so as to allow the nanotubes and/or other possible particles such as inorganic filler particles to be substantially non-agglomerated and to be substantially uniformly-dispersed in the nanotube media or the fluoropolymer.

In various embodiments, the stabilizer can include a material selected from the groups consisting of polymeric amines, polymeric acids, conjugated polymers and natural gum materials. In other embodiments, the stabilizer can be a material selected from the groups consisting of polyallylamine, polyethylenimine, poly(diallyldimethylammonium chloride), poly(allylamine hydrochloride), and the mixture thereof. In still other embodiments, the stabilizer can include a material chosen from poly(acrylic acid), poly(3,4-ethylenedioxythiophene), poly(3,4-ethylenedioxythiophene) complexes with a polymeric acid, Gum Arobic, and/or chitosan.

For purposes of this application, the term "dispersion" refers to any system that include one substance being in another, e.g., one substance dissolving in another, or particles or other substance suspending or scattering in a fluid. Thus, the term "dispersion" can also be referred to herein as "solution", "suspension", "latex" or "emulsion". In various embodiments, the dispersion that involves one or more materials of a stabilizer, a fluoropolymer, nanotubes or fillers for the disclosed coating compositions, can be controlled having a pH value. For example, to adjust the pH value, a variety of organic or inorganic acids or alkalines can be used including, but not limited to, acetic acid, sulfonic acid, hydrochloric acid, sodium hydroxide, or any other suitable acids or alkalines known to one of ordinary skill in the art. In various embodiments, the pH value can range from about 2 to about 11. In an additional example, the pH value can be about 3 to about 10. Further embodiments can include a pH value of about 5 to about 9.

In an exemplary embodiment, the "stabilize" can include dual structure functionality. For example, the stabilizer can include a functional amino-group, which can be partially neutralized in a form of $-NH_2$ and can also be partially electrostatic or ionic in a form of $-NH^{3+}$ in the nanotube-containing dispersion, depending on the pH value of the dispersion.

FIG. 1 depicts a schematic showing an exemplary stabilizer polymer having dual structure amino-functional group in accordance with the present teachings. Specifically, the exemplary stabilizer polymer can be a partially neutralized polyallylamine that contains the amino-dual structure functionality including neutralized amino groups (—NH$_2$) (see 105 in FIG. 1) and amines, e.g., ammonium salt (—NH3$^+$ X$^-$) (see 107 in FIG. 1) in an acidic condition. In various embodiments, the exemplary polyallyamine can have a molecular weight ranging from about 300 to about 100,000.

Figure 2:
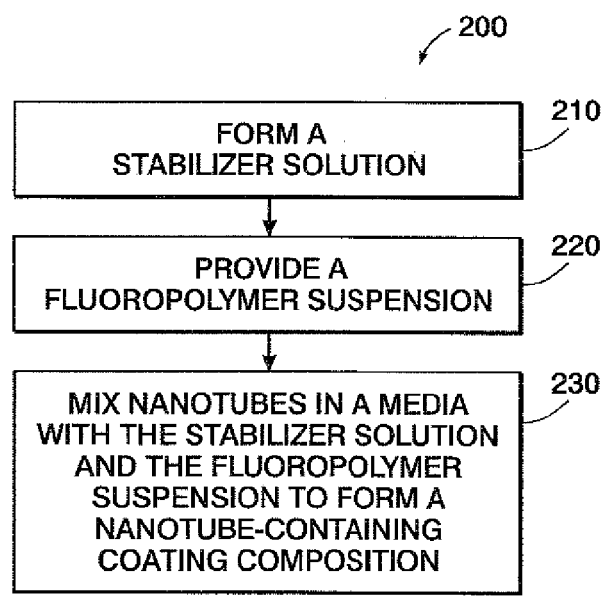
FIG. 2 depicts an exemplary method for forming a stable nanotube-coating composition in accordance with the present teachings.
Figure 3:
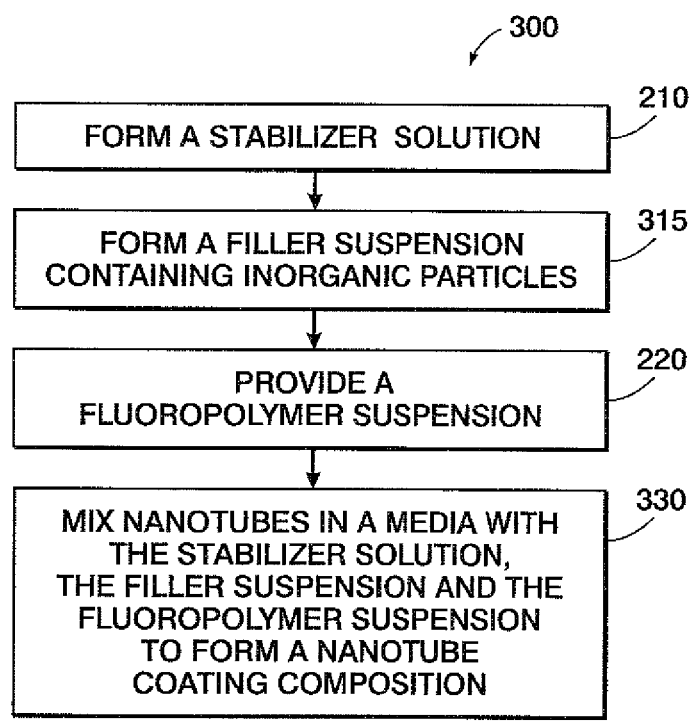
FIG. 3 depicts another exemplary method for forming a stable nanotube-coating composition in accordance with the present teachings.

FIGS. 2-3 depict exemplary methods 200 and 300 for forming a stable nanotube coating composition in accordance with the present teachings. Note that while the exemplary method 200 or 300 is illustrated and described below as a series of acts or events, it will be appreciated that the present invention is not limited by the illustrated ordering of such acts or events. For example, some acts may occur in different orders and/or concurrently with other acts or events apart from those illustrated and/or described herein, in accordance with the present teachings. In addition, not all illustrated steps may be required to implement a methodology in accordance with the present teachings.

In various embodiments, ultrasonic energy sources, such as high-intensity ultrasonic processors, can be used to sonicate the dispersion as desired during any stage(s) of forming the nanotube coating composition to facilitate the dispersing of the stabilizer, the nanotubes, the inorganic filler particles and/or the fluoropolymer. In addition, pH value of the dispersion can be adjusted to maintain a desired value during any stage(s) of forming the nanotube coating composition.

Referring back to FIG. 2, at 210, a stabilizer solution can be formed. The stabilizer solution can include one or more stabilizers, such as, polyallylamine, in a suitable solvent, such as water. In an exemplary embodiment, hydrochloride acid (HCl) can be used to control the pH value of the stabilizer solution when polyallylamine is used.

In FIG. 2 at 220, fluoropolymer(s) can be provided in a form of colloid dispersion, latex, suspension, or a mixture thereof. For example, the fluoropolymer can be in a form of particle dispersion with an average particle size ranging from about 10 to about 5000 nanometers. In an exemplary embodiment, the fluoropolymer can include a mixture of small particles with average particle size ranging from about 50 to about 500 nanometers, and large particles with average particle size ranging from about 1 to about 50 micrometers.

In FIG. 2 at 230, a nanotube coating composition can be formed by mixing the nanotubes (e.g., CNTS) in a media, the stabilizer solution, and the fluoropolymer emulsion/suspension together. In one embodiment, the nanotubes in the media can be firstly mixed with the stabilizer solution and then mixed with the fluoropolymer emulsion In another embodiment, the nanotubes in the media can be mixed with the mixture of the stabilizer solution with the provided fluoropolymer emulsion. In a further embodiment, the nanotubes in the media can be firstly mixed with the fluoropolymer emulsion and then mixed with the stabilizer solution Fillers can often be used in polymer formulations as reinforcing particles to improve the hardness and wear resistance. In various embodiments, fillers, such as inorganic particles, can be used to form the nanotube coating composition. For example, the inorganic particles can be dispersed in a media, such as water, to form a filler suspension. In an exemplary embodiment, the filler suspension can be prepared by sonication of inorganic particles in the presents of surface treatment agents such as silanes in water. In various embodiments, the inorganic particles can include, but are not limited to, metal oxides, non-metal oxides, metals, or other suitable particles. Specifically, the metal oxides can include, for example, silicon oxide, aluminum oxide, chromium oxide, zirconium oxide, zinc oxide, tin oxide, iron oxide, magnesium oxide, manganese oxide, nickel oxide, copper oxide, antimony pentoxide, indium tin oxide, and mixtures thereof. The non-metal oxides can include, for example, boron nitride, silicon carbides (SiC) and the like. The metals can include, for example, nickel, copper, silver, gold, zinc, iron and the like. In various embodiments, other additives known to one of ordinary skill in the art can also be included in the nanotube coating composition.

FIG. 3 depicts another exemplary nanotube coating composition containing filler materials and a method for making such suspension in accordance with the present teachings.

As shown in FIG. 3, at 315, a filler suspension can be prepared containing the inorganic particles as disclosed herein in a water solvent, for example. At 330, the filler suspension formed at 315 can then be mixed with the nanotubes, the stabilizer solution formed at 210 and the fluoropolymer dispersion formed at 220 to form the disclosed coating composition suspension. In various embodiments, the formation of the nanotube suspension at 210 and the formation of the fluoropolymer suspension at 220 can be similar as that described in FIG. 2.

In an exemplary embodiment, the disclosed coating composition can include, e.g., fluoropolymer latex particles of about 10 to 50 percent by weight of total coating composition; carbon nanotubes of about 0.1 to about 10 percent by weight of total coating composition, polyallyamine of about 0.1 to about 10 percent by weight of total coating composition; water as media of about 50 to about 90 percent by weight of total coating composition; and optionally filler(s) of about 0.5 to 10 percent by weight of total coating composition.

In various embodiments, the nanotube coating composition formed as shown in FIGS. 2-3 can be, for example, a stable and uniform CNT/PFA aqueous dispersion that has a suitable shelf life, and can be "coated" onto an article surface as a coated layer to form a coated article. The coated article can be used as, for example, a fuser member, a fixing member, a pressure roller, and/or a release agent donor member in an electrostatographic printing device and process.

The article surface to be coated can include a substrate for all possible members/rollers described thereabove. The substrate can be in a form including, but not limited to, a belt, plate, sheet, and/or cylindrical drum. In various embodiments, the substrate to be coated can include a wide variety of materials, such as, for example, metals, metal alloys, rubbers, glass, ceramics, plastics, or fabrics. For example, the metals used can include aluminum, anodized aluminum, steel, nickel, copper, and mixtures thereof, while the plastics used can include polyimides, polyester, polyetheretherketone (PEEK), poly(arylene ether)s, polyamides and mixtures thereof. In various embodiments, one or more functional layers can be disposed between the substrate and the coated layer.

Various coating techniques can be applied to form the disclosed nanotube-composite coated article. As used herein, the term "coating technique" refers to a technique or a process for applying, forming, or depositing the coating composition on a material or a surface. Therefore, the term "coating" or "coating technique" is not particularly limited in the present teachings, and dip coating, painting, brush coating, roller coating, pad application, spray coating, spin coating, casting, or flow coating can be employed. For example, the nanotube coating composition can be coated on a piece of silicon wafer by spray-coating with an air-brush.

After the nanotube coating composition is coated on the desired article surface, a drying process can be performed. For example, the coated article can be baked at a temperature of about 200° C. or higher, such as about 200° C. to about 400° C. in some cases, for a certain time length. In an exemplary embodiment, the coated article can be dried at 350° C. for about 20 minutes followed by a drying at 360° C. for about 10 minutes. Alternatively, the drying process can include a vacuum oven. Regardless of the manner in which the coating is formed, each dried coating layer can have a thickness. In various embodiments, the coating and drying process can be repeated as desired to achieve a required thickness, for example, ranging from about 5 micron to about 50 micron, depending on the specific application of the coated article.

In one embodiment for preparing the coated article, nanotubes such as carbon nanotubes (CNTs), can be added in a solution containing poly(allyamine), followed by a sonication process in a suitable pH environment. Such dispersion can then be mixed with fluoropolymer (e.g., Teflon PFA) emulsion to form a stable nanotube coating composition using a sonication process. Uniform coating can then be achieved by, e.g., spray-coating of the CNT/PFA dispersion onto an article surface, followed by baking the coated article at high temperatures, e.g., 20 minutes at 351° C., then 10 minutes at 360° C.

In another embodiment for preparing the coated article, exemplary CNTs can be admixed with poly(allyamine) solution. A stable and uniform CNT/PFA dispersion, e.g., in aqueous media, can be achieved by a further mixing with the exemplary PFA emulsion. Inorganic particles can then be surface-treated in an aqueous media and combined with the CNT/PFA dispersion to prepare filler-containing nanotube coating composition. Note that, during the dispersion preparation, sonication can be used as desired and pH value of the dispersion can be maintained. In an exemplary embodiment, a stable and uniform dispersion containing CNT, PFA and SiC can be prepared and be spray-coated onto an article surface, followed by a baking process at high temperatures, e.g., at about 351° C. for about 20 minutes, then at about 360° C. for about 10 minutes.

Figure 4A:
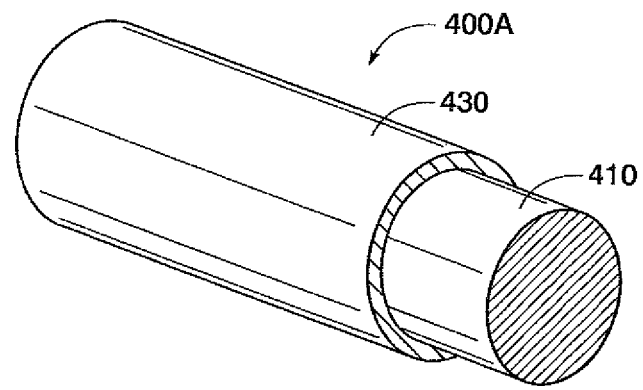
FIGS. 4A-4B depict exemplary coated articles having an exemplary core substrate in accordance with the present teachings.
Figure 4B:
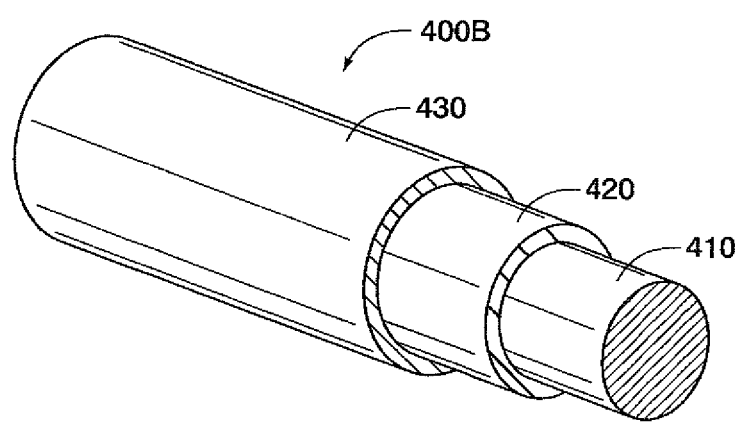

FIGS. 4A-4B depict exemplary coated articles 400A-B having an exemplary core substrate 410 in accordance with the present teachings. It should be readily apparent to one of ordinary skill in the art that the devices 400A-B depicted in FIGS. 4A-4B represent generalized schematic illustrations and that other layers/substrates can be added or existing layers/substrates can be removed or modified.

The coated articles 400 A-B can be fuser rollers with one or more functional layers 420 and/or 430 formed on the core substrate 410. In various embodiments, the core substrate 410 can take the form of a cylindrical tube or a solid cylindrical shaft. One of ordinary skill in the art will understand that other substrate forms, e.g., a belt substrate, can be used to maintain rigidity, structural integrity of the coated article.

As shown, the outermost layers 430 in FIG. 4A, and in FIG. 4B can be a coated layer formed from the disclosed nanotube coating composition (e.g., formed from the method 200 in FIG. 2 or the method 300 in FIG. 3). The coating composition coated layer can be formed directly on the substrate surface 410 (see 430 in FIG. 4A) or can be formed on a functional layer 420 that is formed on the substrate surface 410 (see 430 in FIG. 4B). For example, the fuser roll can be in a 2-layer configuration having a compliant layer 420, such as a silicone rubber layer having a thickness of, e.g., about 1 mm. to about 5 mm, disposed between the coated outermost layer 430 and the core substrate 410, such as a metal used in the related art. In various embodiments, the coated outermost layer 430 can have a thickness of from about 5 microns to about 50 microns.

Figure 5A:
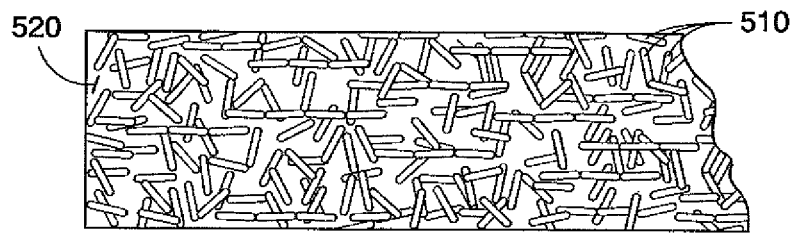
FIGS. 5A-5B are schematics showing exemplary coated layers used as the outermost layer of the coated articles of FIGS. 4A-4B formed by the method of FIG. 2 in accordance with the present teachings.
Figure 5B:
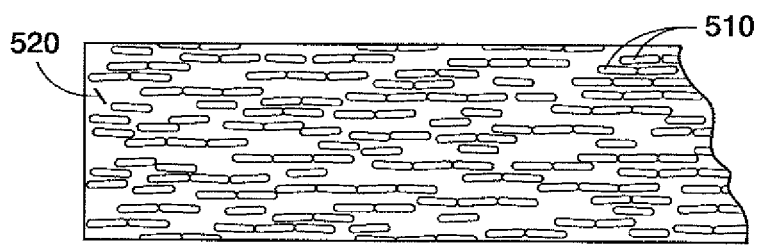

FIGS. 5A-5B are schematics showing exemplary coated coating composition layers, e.g., the outermost layers 430 of FIGS. 4A-4B, formed by the method 200 of FIG. 2 in accordance with the present teachings. As shown in FIGS. 5A-5B, although the plurality of nanotubes 510 is depicted having a consistent size in FIGS. 5A-5B, one of ordinary skill in the art will understand that the plurality of nanotubes 510 can have different sizes, for example, different lengths, widths and/or diameters. In addition, it should be readily apparent to one of ordinary skill in the art that coated layer depicted in FIGS. 5A-5B represents a generalized schematic illustration and that other nanotubes/dopants/layers can be added or existing nanotubes/dopants/layers can be removed or modified.

In FIG. 5A, the plurality of nanotubes 510, such as CNTs, can be dispersed uniformly throughout an exemplary fluoropolymer matrix 520. For example, this distribution can include bundled nanotubes 510 dispersed uniformly but with random tangles throughout the polymer matrix 520 of the coated layer 430.

In FIG. 5B, the plurality of nanotubes 510 can be dispersed uniformly and spatially-controlled, for example, be aligned or oriented at certain directions, throughout the polymer matrix 520 of the coated layer 430 by, for example, use of a magnetic field.

Figure 6A:
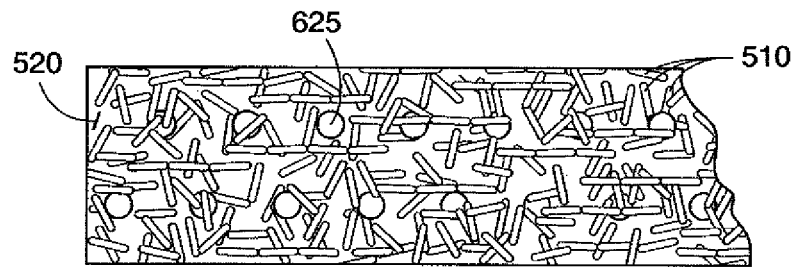
FIGS. 6A-6B are schematics showing exemplary coated layers used as the outermost layer of the coated articles of FIGS. 4A-4B formed by the method of FIG. 3 in accordance with the present teachings.
Figure 6B:
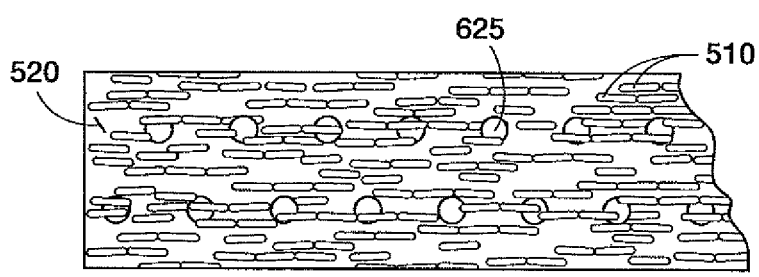

FIGS. 6A-6B are schematics showing exemplary coated coating composition layers, e.g., the outermost layers 430 of FIGS. 4A-4B, formed by the method 300 of FIG. 3 in accordance with the present teachings. As compared with the coated layer shown in FIGS. 5A-5B, the coated layer in FIGS. 6A-6B can further include a plurality of fillers 625 along with the plurality of nanotubes 510, which are stably and uniformly dispersed in the fluoropolymer 520. The plurality of fillers 625 can include, such as, for example, aluminum oxide, chromium oxide, zirconium oxide, zinc oxide, tin oxide, iron oxide, magnesium oxide, manganese oxide, nickel oxide, copper oxide, antimony pentoxide, indium tin oxide, boron nitride, silicon carbides, nickel, copper, silver, gold, zinc, or iron.

Figure 7A:
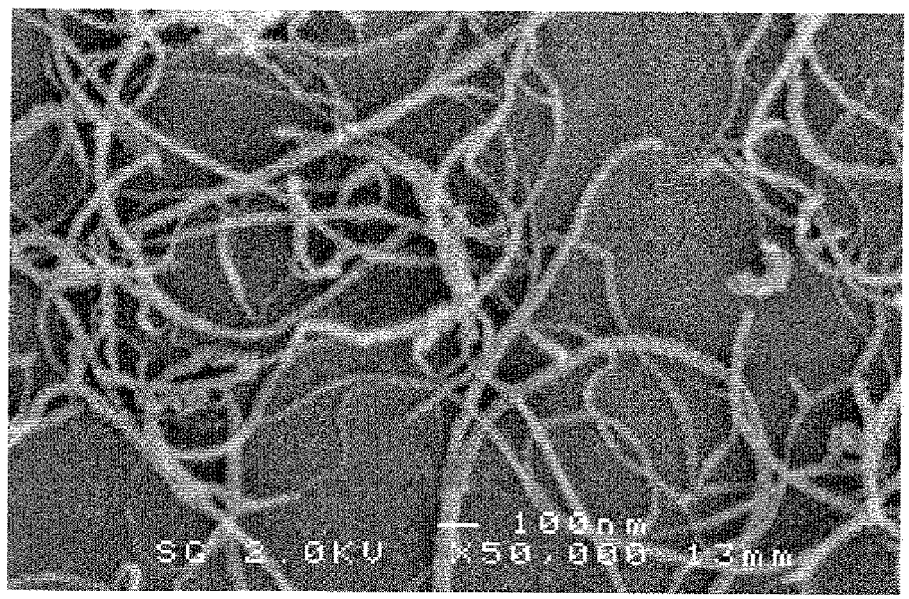
FIG. 7A depicts exemplary as-received carbon nanotubes in accordance with the present teachings.
Figure 7B:
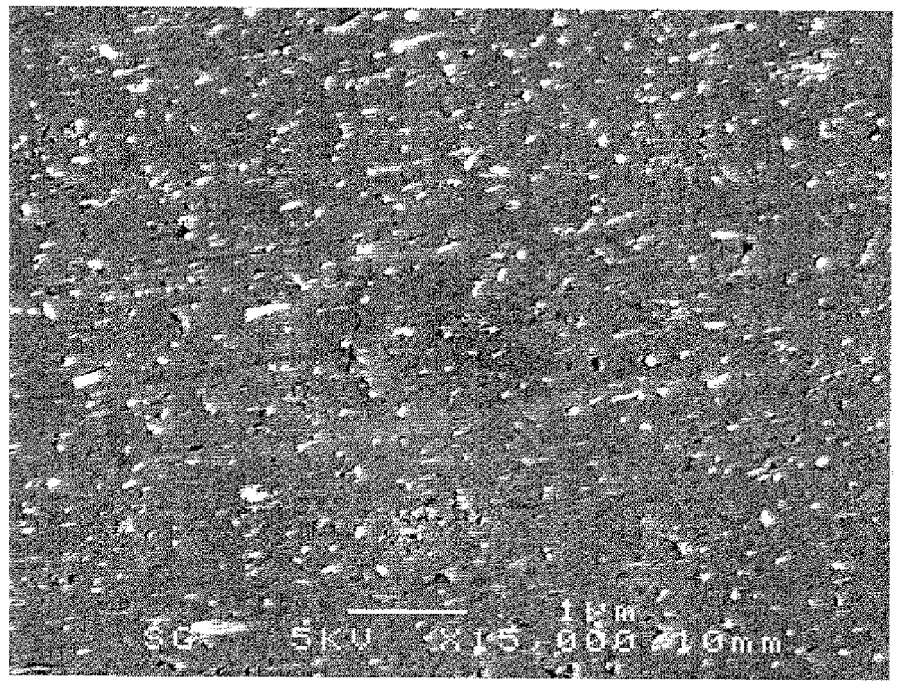
FIG. 7B depicts an exemplary nanotube-composition coated layer in accordance with the present teachings.

FIGS. 7A-7B depict a comparison between as-received carbon nanotubes (see FIG. 7A) and an exemplary coated coating composition layer (see FIG. 7B) containing CNTs in the fluoropolymer PFA matrix using a stabilizer polyallylamine in accordance with the present teachings. As compared with the as-received nanotubes in FIG. 7A, FIG. 7B indicates that the nanotubes can be uniformly dispersed within the coated layer.

Figure 8:
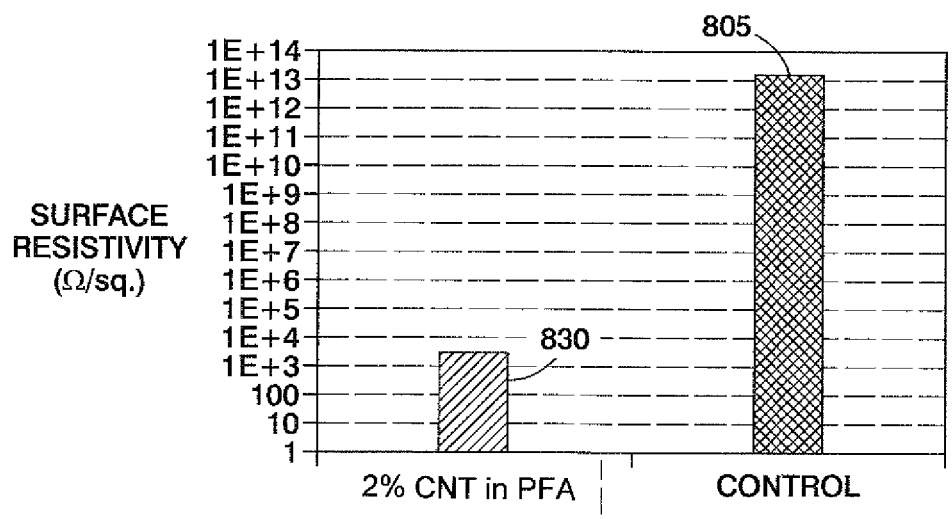
FIG. 8 depicts a surface resistivity for an exemplary CNT/fluoropolymer coated layer in accordance with the present teachings.

In various embodiments, the coated coating composition layer shown in FIGS. 4-7 can provide desired electrical, mechanical, and thermal properties for using in the electrostatographic printing devices and processes For example, FIG. 8 shows a surface resistivity result for an exemplary CNT/PFA coated layer in accordance with the present teachings. In this example, the CNT/PFA coating can be formed on a silicon wafer and can have about 2 wt % CNT loading in the PFA matrix. As shown, the surface resistivity of the coated layer can be decreased dramatically (see curve 830), as compared with the control sample that only contains PFA but without CNTs (see curve 805). That is, the surface conductivity of the coated CNT/PFA layer can be dramatically increased due to the use of nanotubes. In various embodiments, the disclosed coated layer can provide a surface resistivity of about $10^8$ Ω/sq or less.

EXAMPLES

Example 1

Mixing of CNTs with Polyallylamine Stabilizer

A polyallylamine stabilizer solution was prepared by dissolving about 0.05 gram polyallylamine in about 5 g deionized water. About 0.1 gram of CNTs was then added into the prepared polyallylamine solution, followed by a sonication with a high power sonicator for about 1 min at 60% output. About 1 mL of 1 N HCl solution was added into the CNT/polyallylamine dispersion which was sonicated for 1 min again. The resulting CNT/polyallylamine dispersion was observed to be uniformly coated on a piece of glass slide.

Example 2

Preparation of CNT/PFA Dispersion

About 1 gram of the mixture of CNT/polyallylamine prepared from example 1 was further mixed with a PFA dispersion having a weight of about 1 gram, thereby resulting in about 2% of CNT in PFA. Prior to coating, the CNT/PFA dispersion was sonicated for about 1 min, and uniformly coated on the glass slide.

Example 3

Preparation of SiC Filler Suspension

The SiC particles (e g., about 0.5 micron in size) were dispersed in 1% aminopropylsilane (APS) aqueous solution. APS was used as an exemplary surface treatment agent to facilitate the dispersing of the SiC particles. The resulting dispersion was sonicated for about 1 min for obtaining a uniform dispersion.

Example 4

Preparation of CNT/PFA/SiC Dispersion

About 6.6 gram of the mixture of CNT/polyallylamine dispersion prepared from the example 1, and about 3 gram of the SiC dispersion prepared from the example 3 were mixed with about 4.65 gram PFA dispersion, thereby resulting in about 2 wt % of CNT and 5 wt % SIC in PFA. The coating composition was also sonicated for 1 min, and uniformly coated on the glass slide.

Example 5

Preparation of Fuser Member Having CNT/PFA Topcoat

The fuser member was constructed with a metal insert or substrate, preferably aluminum, but possibly including steel. To form the silicone layer, Toray DY35-6072 silicone was applied to the substrate via molding, post-cured, ground, and cleaned. The silicone layer was adhered to the substrate or base of the fuser roll using an adhesive, DowCorning P5200. The resulting silicone layer had a thickness of about 0.05-7 mm, and in some cases, about 0.22 mm. An aminosilane adhesive layer was applied to the surface of the silicone layer. A base fluoropolymer layer was then applied to the surface of the aminosilane adhesive layer. This fluoropolymer layer was formed from DuPont 855-021 (from E.I. DuPont de Nemours and Co), which contains polytetrafluoroethylene, fluorinated ethylene propylene resin and polyamide-imide polymer in solvent. This base-coat layer was applied by spray-coating at a thickness of approximately 3-5 micrometers. An outer surface CNT/PFA layer was then applied on the base-coat fluoropolymer layer This outer surface layer was formed from CNT/PFA, or CNT/PFA/SiC coating composition described in Example 2 and 4. This layer was applied by spray coating at an approximate thickness of about 20-25 micrometers. The coating layer was then baked at about 350° C. for about 20 min and about 360° C. for about 10 min. The dried coatings were uniform. The electrical resistivity was measured to be about $1.0\times10^3$ to about $1.0\times10^5$ Ω/sq.

Example 6

Preparation of Fuser Member Having CNT/PFA Topcoat

The coating composition, including CNT/PFA, or CNT/PFA/SiC, was coated on a metal fuser roll by spray-coating. The coating was then baked at about 350° C. for about 20 min and about 360° C. for about 10 min. The dried coatings were uniform. The electrical resistivity was measured to be about $1.0\times10^3$ to about $1.0\times10^4$ Ω/sq.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A coated article comprising:
a substrate, and
a coated layer disposed over the substrate and formed from a coating composition applied on the substrate, the coated layer having a thickness ranging from about 5 microns to about 20 microns, wherein the coating composition comprises:
a polyfluoroalkoxypolytetrafluorethylene fluoropolymer;
a plurality of nanotubes dispersed in a media; and
a stabilizer mixed with the fluoropolymer and the plurality of nanotubes in the media, the stabilizer being a partially neutralized polyallylamine polymer comprising i) an amino substituent and ii) an ammonium ion substituent or salt thereof at a pH value ranging from 5 to 9, the stabilizer allowing a stable dispersion of the plurality of nanotubes in the media and in the fluoropolymer, the stabilizer having a molecular weight ranging from 300 to about 100,000,
wherein the coated article is one of a fuser roll, a fixing roll, a pressure roller, and a release agent donor roll for an electrostatographic device.

2. The coated article of claim 1, wherein each of the plurality of nanotubes comprises a single wall carbon nanotube (SWCNT), a multi-wall carbon nanotube (MWCNT), or the mixtures thereof.

3. The coated article of claim 1, wherein each of the plurality of nanotubes has an inside diameter ranging from about 0.5 nanometer to about 20 nanometers as well as an outside diameter ranging from about 1 nanometer to about 80 nanometers, and has an aspect ratio ranging from about 1 to about 10000.

4. The coated article of claim 1, wherein the media for the plurality of nanotubes is a liquid selected from the group consisting of an alcohol, an aliphatic hydrocarbon of from C5 to about C18, an aromatic hydrocarbon of from C6 to C18, an ether, a ketone, an amide, and mixtures thereof.

5. The coated article of claim 1, wherein the plurality of nanotubes is present in an amount from about 0.01 percent to about 20 percent by weight of the fluoropolymer.

6. The coated article of claim 1, wherein the fluoropolymer is in a form of colloid dispersion, latex, suspension, or mixtures thereof.

7. The coated article of claim 1, wherein the fluoropolymer is in a form of a particle dispersion with an average overall particle size ranging from about 10 nanometers to about 5000 nanometers.

8. The coated article of claim 1, further comprising one or more filler particles, the filler particles comprising metal oxides, silicon carbide, boron nitride, or graphite, wherein the metal oxides are selected from the group consisting of silicon oxide, aluminum oxide, zirconium oxide, zinc oxide, tin oxide, iron oxide, magnesium oxide, manganese oxide, nickel oxide, copper oxide, antimony pentoxide, indium tin oxide, and mixtures thereof.

9. The coated article of claim 1, comprising,
the polyfluoroalkoxypolytetrafluorethylene fluoropolymer comprising a plurality of fluoropolymer latex particles in a concentration of about 10 percent to about 50 percent by weight of the coating composition,
the plurality of carbon nanotubes in a concentration of about 0.1 percent to about 10 percent by weight of the coating composition,
the partially neutralized polyallyamine stabilizer in a concentration of about 0.1 percent to about 10 percent by weight of the coating composition,
a water media of about 50 percent to about 90 percent by weight of the coating composition, and
optionally, one or more fillers of about 0.5 percent to 10 percent by weight of the coating composition.

10. The coated article of claim 1, wherein the fluoropolymer comprises a mixture of a plurality of small fluoropolymer particles, having an average small particle size ranging from about 50 nanometers to about 500 nanometers, and a plurality of large fluoropolymer particles, having an average large particle size ranging from about 1 micrometer to about 50 micrometers.

11. The coated article of claim 1, wherein the pH value ranges from 8 to 9.

12. A coated article comprising:
a substrate, and
a coated layer disposed over the substrate and formed from a coating composition applied on the substrate, wherein the coating composition comprises a polyfluoroalkoxypolytetrafluorethylene fluoropolymer, a plurality of nanotubes dispersed in a media, and a stabilizer mixed with the fluoropolymer and the plurality of nanotubes in the media, the stabilizer being a partially neutralized polyallyamine polymer comprising i) an amino substituent and ii) an ammonium ion substituent or salt thereof at a pH value of 5 to 9, the stabilizer allowing a stable dispersion of the plurality of nanotubes in the media and in the fluoropolymer, wherein the fluoropolymer comprises a mixture of a plurality of small fluoropolymer particles, having an average small particle size ranging from about 50 nanometers to about 500 nanometers, and a plurality of large fluoropolymer particles, having an average large particle size ranging from about 1 micrometer to about 50 micrometers,
wherein the coated layer has a thickness ranging from about 5 microns to about 20 microns, and
wherein the coated article is one of a fuser roll, a fixing roll, a pressure roller, and a release agent donor roll for an electrostatographic device.

13. The coated article of claim 12, wherein the coated layer is formed by heating at a temperature ranging from about 200° C. to about 400° C.

14. The coated article of claim 12, wherein the coated layer has a surface resistivity of about $10^8$ Ω/sq or less.

15. The coated article of claim 12, wherein the substrate is formed of a material selected from the group consisting of metals, plastics, and ceramics,
wherein the metals are selected from the group consisting of aluminum, anodized aluminum, steel, nickel, copper, and mixtures thereof, and
wherein the plastics are selected from the group consisting of polyimides, polyester, PEEK, poly(arylene ether)s, polyam ides and mixtures thereof.

16. The coated article of claim 12, wherein the substrate is in a form of a cylinder, a belt or a sheet.

17. The coated article of claim 12, further comprising one or more functional layers disposed between the substrate and the coated layer.

18. The coated article of claim 12, wherein the media for the plurality of nanotubes is a liquid selected from the group consisting of an alcohol, an aliphatic hydrocarbon of from C5 to about C18, an aromatic hydrocarbon of from C6 to C18, an ether, a ketone, an amide, and mixtures thereof.

19. The coated article of claim 12, wherein the pH value ranges from 8 to 9.

20. A coated article comprising:
a substrate, and
a coated layer disposed over the substrate and formed from a coating composition applied on the substrate, the coated layer having a thickness ranging from about 5 microns to about 20 microns,
wherein the coating composition comprises:
a polyfluoroalkoxypolytetrafluorethylene fluoropolymer;
a plurality of nanotubes dispersed in a media; and
a stabilizer mixed with the fluoropolymer and the plurality of nanotubes in the media, the stabilizer being a partially neutralized polyallyamine comprising i) an amino substituent and ii) an ammonium ion substituent or salt thereof at a pH value ranging from 5 to 9, the stabilizer allowing a stable dispersion of the plurality of nanotubes in the media and in the fluoropolymer,
wherein the coated article is one of a fuser roll, a fixing roll, a pressure roller, and a release agent donor roll for an electrostatographic device.

21. The coated article of claim 20, comprising,
the polyfluoroalkoxypolytetrafluorethylene fluoropolymer comprising a plurality of fluoropolymer latex particles in a concentration of about 10 percent to about 50 percent by weight of the coating composition,
the plurality of carbon nanotubes in a concentration of about 0.1 percent to about 10 percent by weight of the coating composition,
the partially neutralized polyallyamine stabilizer in a concentration of about 0.1 percent to about 10 percent by weight of the coating composition, a water media of about 50 percent to about 90 percent by weight of the coating composition, and optionally, one or more fillers of about 0.5 percent to 10 percent by weight of the coating composition.

22. The coated article of claim 20, wherein the media for the plurality of nanotubes is a liquid selected from the group consisting of an alcohol, an aliphatic hydrocarbon of from C5 to about C18, an aromatic hydrocarbon of from C6 to C18, an ether, a ketone, an amide, and mixtures thereof.

23. The coated article of claim 20, wherein the pH value ranges from 8 to 9.

* * * * *